United States Patent
Seshadri et al.

(10) Patent No.: US 10,301,478 B2
(45) Date of Patent: May 28, 2019

(54) AQUEOUS PRIMER COATING COMPOSITION AND USE

(71) Applicant: HERCULES LLC, Wilmington, DE (US)

(72) Inventors: Venkataramanan Seshadri, Powell, OH (US); Charles Joseph Wasserman, Waukesha, WI (US); Biswajit Ghosh, Powell, OH (US); Byoungchul Lee, Dublin, OH (US)

(73) Assignee: HERCULES LLC, Wilmington, DE (US)

( * ) Notice: Subject to any disclaimer, the term of this patent is extended or adjusted under 35 U.S.C. 154(b) by 0 days.

(21) Appl. No.: 15/596,622

(22) Filed: May 16, 2017

(65) Prior Publication Data

US 2017/0335115 A1    Nov. 23, 2017

Related U.S. Application Data

(60) Provisional application No. 62/338,029, filed on May 18, 2016.

(51) Int. Cl.
| | |
|---|---|
| *C09D 5/00* | (2006.01) |
| *C09D 139/06* | (2006.01) |
| *C09D 175/04* | (2006.01) |
| *C09D 179/02* | (2006.01) |
| *C09D 5/02* | (2006.01) |

(52) U.S. Cl.
CPC ............. *C09D 5/002* (2013.01); *C09D 5/022* (2013.01); *C09D 139/06* (2013.01); *C09D 175/04* (2013.01); *C09D 179/02* (2013.01)

(58) Field of Classification Search
CPC ...... C09D 5/002; C09D 5/022; C09D 139/06; C09D 175/04; C09D 179/02
See application file for complete search history.

(56) References Cited

U.S. PATENT DOCUMENTS

| | | |
|---|---|---|
| 7,470,736 B2 | 12/2008 | Cooper |
| 8,491,975 B2 | 7/2013 | Liao |
| 8,759,454 B2 | 6/2014 | Kwon et al. |
| 9,175,172 B2 | 11/2015 | Regnier |
| 2004/0002570 A1 | 1/2004 | Parrinello et al. |
| 2004/0242726 A1 | 12/2004 | Waki et al. |
| 2005/0008794 A1* | 1/2005 | Graczyk ............... B41M 5/502 428/32.24 |
| 2005/0238825 A1 | 10/2005 | Hood et al. |
| 2005/0245651 A1 | 11/2005 | Cooper |
| 2013/0224395 A1 | 8/2013 | Regnier |

FOREIGN PATENT DOCUMENTS

| | | |
|---|---|---|
| AO | WO2014022361 A1 | 7/2013 |
| EP | 0962330 A2 | 12/1999 |
| WO | WO2013096344 A1 | 6/2013 |
| WO | WO2014044322 A1 | 3/2014 |
| WO | WO20150184046 A1 | 12/2015 |

\* cited by examiner

*Primary Examiner* — Edward J Cain

(74) *Attorney, Agent, or Firm* — Shaorong Chen; William J. Davis; Nathalie Tietcheu

(57) ABSTRACT

An aqueous primer coating composition to a substrate comprises an aqueous cationic polyurethane and an aqueous polymer of oxazoline or N-vinylpyrrolidone. Also disclosed is a method applying the coating composition to the substrate and an electrophotographical printing medium coated with the coating composition.

20 Claims, No Drawings

AQUEOUS PRIMER COATING COMPOSITION AND USE

CROSS REFERENCE TO RELATED APPLICATIONS

The present application claims the benefit under 35 U.S.C. 119 (e) of U.S. Provisional Patent Application Ser. No. 62/338,029, filed on May 18, 2016, the entire content of which is hereby expressly incorporated herein by reference.

BACKGROUND OF THE INVENTION

1. Field of the Disclosed and Claimed Inventive Concept(s)

The presently disclosed process(es), procedure(s), method(s), product(s), result(s), and/or concept(s) (collectively referred to hereinafter as the "present disclosure") relates generally to an aqueous primer coating composition to a substrate. Additionally, the present disclosure relates generally to a substrate coated with the aqueous primer coating composition.

2. Background and Applicable Aspects of the Presently Disclosed and Claimed Inventive Concept(s)

Recently, the use of on-demand digital printing machines utilizing liquid or dry toners or inks in electrophotographic systems has become widespread. Printers using such toners or inks are commercially available from Hewlett-Packard Company under the trade name HP Indigo.

However, it is well known in the art that liquid toilers do not transfer well and/or adhere well to films or paper substrates unless those films or paper substrates have been treated with a coating or primer to enhance their adhesion to a substrate.

A number of primers have been developed for use on substrates such as polymeric films which render the surface of the films more receptive to liquid toners. However, the development of newer, high speed digital presses has presented new challenges to the use of such primers for liquid toner transfer and adhesion to the substrate. For example, the more recently developed HP Indigo 6000 series of digital presses offer higher speed printing at about twice the speed of conventional printing presses. These higher speeds require shorter toner to substrate transfer times, which in turn require lower activation temperatures for the primer to effectively enhance toner transfer and adhesion to the printed substrate. As a result, substrates coated with existing primers may provide poor toner transfer and adhesion when run through the newest generation of digital printing presses. In addition, the substrates also show poor water resistance, which is especially important for the primed and printed substrates exposed to water for a long time such as labels on beer bottles.

Accordingly, there is a need in the art for a primer for use with high speed digital printing presses which provides not only good liquid toner transfer and adhesion to a variety of substrates but also good water resistance.

DETAILED DESCRIPTION

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All the articles and/or methods disclosed herein can be made and executed without undue experimentation in light of the present disclosure. While the articles and methods of the present disclosure have been described in terms of preferred embodiments, it will be apparent to those of ordinary skill in the art that variations may be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described circumstance completely occurs or that the subsequently described circumstance occurs to a great extent or degree.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that may vary depending upon the desired properties to be obtained in carrying out the invention.

The term "monomer" refers to a small molecule that chemically bonds during polymerization to one or more monomers of the same or different kind to form a polymer.

The term "polymer" refers to a large molecule comprising one or more types of monomer residues (repeating units) connected by covalent chemical bonds. By this definition, polymer encompasses compounds wherein the number of monomer units may range from very few, which more commonly may be called as oligomers, to very many. In the present disclosure, polymers can be homopolymers, and non-homopolymers such as copolymers, terpolymers, tetrapolymers and the higher analogues. The polymer may have a random, block, and/or alternating architecture.

The term "tethered" herein is synonymous to terms "laterally attached", "pendant" and "side-chain groups" which are equally used in the technical literature. These laterally attached tertiary amine groups can be optionally neutralized and/or quaternized.

Polyurethane is a term used to describe polymers including oligomers (e.g., prepolymers) which contain the urethane group, i.e., —O—C(=O)—NH—, regardless of how they are made. As well known, these polyurethanes can contain additional groups such as urea, allophanate, biuret, carbodiimide, oxazolidinyl, isocynaurate, uretdione, ester, ether, carbonate, hydrocarbon, fluorocarbon, alcohol, mercaptan, amine, hydrazide, siloxane, silane, ketone, olefin, etc., in addition to urethane groups.

The present disclosure relates to an aqueous primer coating composition to a substrate comprising an aqueous cationic polyurethane and an aqueous polymer oxazoline or polymer of N-vinylpyrrolidone. The polymer of N-vinylpyrrolidone can be a solution or dispersion.

The polymer of oxazoline can be represented by a general formula (I):

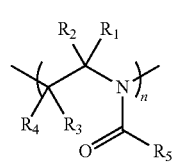

(I)

where $R_1$-$R_4$ are identical or different and are each independently a hydrogen atom, a halogen atom, an unsubstituted alkyl group or substituted alkyl group, an unsubstituted phenyl group or substituted phenyl group; $R_5$ is a hydrogen atom or an alkyl group having 1 to 30 carbon atoms; and n is an integer and greater than 10.

The aqueous polymer of oxazoline can be a solution or dispersion. In one non-limiting embodiment, the polymer of oxazoline is poly(2-ethyl oxazoline), poly(2-nonyl-2-oxazoline), poly(2-phenyl-2-oxazoline), poly(2-methyloxazoline), poly(2-propyloxazoline, or combinations thereof.

The aqueous cationic polyurethane can be a solution or dispersion. The aqueous cationic polyurethane dispersion comprises a polyurethane backbone segment with one or more tethered tertiary amino groups laterally attached to the backbone segment, wherein the tertiary amino groups are optionally partially or fully neutralized or quaternized and wherein the tertiary amine groups are separated from the polyurethane backbone by at least two intervening atoms in their tethering groups. In one non-limiting embodiment, the aqueous cationic polyurethane dispersion comprises about 25% to about 95% by weight of solids.

There are two ways to impart the cationic charge: neutralization by acids and quaternization by organic halides, sulfates and oxiranes (epoxides). Unlike neutralization, quaternization is permanent. Salt formation with acids is reversible especially if the acid is volatile (e.g., acetic or hydrochloric acid). The amine salts revert to unneutralized form during drying, and the polymer becomes water resistant, providing superior performance.

Polyurethanes used in the present disclosure can be formed from at least one polyisocyanates and at least one NCO-reactive compound.

Any compound that provides a source of active hydrogen for reacting with isocyanate groups via the following reaction: —NCO+F—H—X—>—NH—C(=O)—X, can be used as the NCO-reactive compound. Examples can include, but are not limited to, polyols, polythiols and polyamines.

Suitable polyisocyanates have an average of about two or more isocyanate groups, for example, an average of about two to about four isocyanate groups per molecule and include aliphatic, cycloaliphatic, araliphatic, aromatic, and heterocyclic polyisocyanates, as well as products of their oligomerization, used alone or in mixtures of two or more. Diisocyanates can be used, but even monofunctional isocyanates can be used, for example, as molecular-weight controlling agents.

Specific examples of suitable aliphatic polyisocyanates can include, but are not limited to, alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-I,5-pentamethylene diisocyanate, lysine diisocyanate and the like. Polyisocyanates having fewer than 5 carbon atoms can be used but are less preferred because of their high volatility and toxicity. In one non-limiting embodiment, the aliphatic polyisocyanates can include hexamethylene-I,6-diisocyanate, 2,2,4-trimethyl-hexamethylene-diisocyanate, and 2,4,4-trimethyl-hexamethylene diisocyanate.

Specific examples of suitable cycloaliphatic polyisocyanates can include, but are not limited to, dicyclohexylmethane diisocyanate, isophorone diisocyanate, cyclohexane diisocyanate, bis-(isocyanatomethyl) cyclohexane, methylcyclohexane diisocyanate, cyclohexane triisocyanate, their isomers and the like. In one non-limiting embodiment, cycloaliphatic polyisocyanates such as dicyclohexylmethane diisocyanate and isophorone diisocyanate can be used.

Specific examples of suitable araliphatic polyisocyanates can include, but are not limited to, m-tetramethyl xylylene diisocyanate, p-tetramethyl xylylene diisocyanate, 1,4-xylylene diisocyanate, 1,3-xylylene diisocyanate, and the like.

Examples of suitable aromatic polyisocyanates can include, but are not limited to, diphenylmethylene diisocyanate, toluene diisocyanate, phenylene diisocyanate, naphthalene diisocyanate, tetrahydronaphthalene diisocyanate, biphenylene diisocyanate, dimethyl biphenylene diisocyanate, dichloro biphenylene diisocyanate, triphenyl methane triisocyanate, their isomers, and the like. Preferred aromatic polyisocyanates include 4,4'-diphenylmethylene diisocyanate and toluene diisocyanate.

Examples of suitable heterocyclic isocyanates can include, but are not limited to, 5,5'-methylenebisfurfuryl isocyanate and 5,5'-isopropylidenebisfurfuryl isocyanate.

Dimers, trimers, and oligomers of the above-mentioned isocyanates may also be used. Examples include polymeric MDI. Isocyanates can be used alone or in combination of two or more.

Cationic polyurethanes contain cationic centers built into and/or attached to the backbone. Such cationic centers include ammonium, phosphonium and sulfonium groups. These groups can be incorporated into the polymer in the ionic form or, optionally, they can be generated by post-neutralization or post-quaternization of corresponding nitrogen, phosphorous, or sulfur moieties. The combination of all the above groups can be used as well as their combination with nonionic stabilization.

A cationic center can be derived from reacting into the polyurethane (through conventional isocyanate reactions with isocyanate-reactive groups on the tertiary amine groups) one or more compounds having tethered tertiary amino group such that, when said compound is incorporated into the polyurethane, the tethered tertiary nitrogen atom is separated by at least two atoms (more preferably at least three atoms) from the closest atom of the polyurethane backbone.

In one non-limiting embodiment, the compounds having tethered tertiary amino group contain on average two reactive groups can be used, which can participate in building polyurethane used in the present disclosure.

Additional examples and preparation of the aqueous cationic polyurethane dispersion are disclosed in WO 2012/058534, which is hereby incorporated by reference herein in its entirety.

The polymer of N-vinylpyrrolidone can be a copolymer that is represented by a general formula (II):

$$(II)$$

where $R_6$-$R_{11}$ are identical or different and are independently a hydrogen atom, an unsubstituted or substituted alkyl group, a halogen atom, an unsubstituted or substituted aryl group; $R_{12}$ is selected from the group consisting of vinyl acetate, substituted or unsubstituted (meth)acrylate, and substituted or unsubstituted (meth)acrylamides; and x and y are integers and greater than 10.

In one non-limiting embodiment, the copolymer of N-vinylpyrrolidone is poly(N-vinylpyrrolidone-co-vinylacetate). In another non-limiting embodiment, the copolymer of N-vinylpyrrolidone is a copolymer of N-vinylpyrrolidone and 3-dimethyl aminopropyl methacrylamide (DMAPMA). In yet another non-limiting embodiment, the copolymer of N-vinylpyrrolidone is a copolymer of N-vinylpyrrolidone and N,N-dimethylaminoethyl methacrylate (DMAEMA).

The polymer of N-vinylpyrrolidone can be a terpolymer. In one non-limiting embodiment, the terpolymer can be a terpolymer of N-vinylpyrrolidone, vinyl acetate and 3-dimethyl aminopropyl methacrylamide (DMAPMA). In another non-limiting embodiment, the terpolymer can be a terpolymer of N-vinylpyrrolidone, vinyl acetate and N,N-dimethylaminoethyl methacrylate (DMAEMA).

Both DMAPMA and DMAEMA in the copolymers or terpolymers can be quaternized or neutralized.

The aqueous primer coating composition further comprises a wetting agent, a defoamer or defoaming agent, a surfactant or a biocide. The wetting agent can be used for reducing the surface tension of the coating to wet out the substrate and to promote flow or leveling of the coating prior to drying. The wetting agent can be volatile or non-volatile.

Suitable volatile wetting agents can include, but are not limited to, alcohols, glycols, ketone, aldehydes, dibasic esters, N-alkylpyrrolidones, esters, butyrolactones, ethylene glycol ethers, propylene glycol ether, methylene chloride, 1,1,1-trichlotoethane, 1,1,2-trichlorethylene, perchloroethylene, hydroxyketones such as diacetone alcohol, aminoalcohols, parachlorobenzotrifluoride, alkanes, alkenes, alkynes, aromatic solvents, formic acid, acetic acid, propionic acid, butyric acid, mineral acids, 2-bornanone, phenols, wintergreen oil, peppermint oil, eugenol and turpentine. In one non-limiting embodiment, the volatile wetting agent can be propylene glycol or isopropyl alcohol.

Examples of the non-volatile wetting agents can include, but are not limited to, alkylphenol ethoxylates, ethoxylated alkylphenol sulfates, dialkylsulfosuccinates, alkyl phosphates, ethoxylated alkylphosphates, alkyl sulfonates, alkyl ethoxylates, alkyl ethoxylate sulfates, alkyl sulfates, tetramethy-5-decyne-4,7-diol, 2,4,7,9-ethoxylated tetramethyl-5-decyne-4,7-diol, 2,4,7,9-tributoxyethylphosphate, citrate esters such as triacetin and acetyltributylcitrate, silicones, ethoxylated silicones, glycerine, ethoxylated, propoxylated ethers, ethoxylated, propoxylated esters, ethoxylated, propoxylated alcohols, polyoxyethylene, fluoro surfactants, betaines, amphoterics and quaternary amines.

The wetting agents can also be hyper branched polymers, polyether-modified polydimethylsiloxanes, ionic and non-ionic (meth)acrylate copolymers, high molecular mass block copolymers containing groups having pigment affinity, and combinations thereof.

Surfactants can be nonionic, cationic, anionic, amphoteric and zwiterionic surfactants. Examples of the surfactants can include, but are not limited to, triethanolamine, sodium lauryl sulfate, nonionic secondary alcohol ethoxylate, non-ionic acetylinic glycol-based surfactants such as Dynol® 604 from Air Products and Chemicals, Inc., polyalkylene oxide modified polymethylsiloxanes such as Silwet® L-77 from Helena Chemical Company.

Examples of the defoaming agents or defoamers can include, but are not limited to, silicone defoamers, silicone defoamers comprising polysiloxane and hydrophobic particles, silicone-free defoamers comprising hydrophobic particles and polymers, silicone-free defoamers comprising polymers, mineral oil defoamers comprised of paraffin based mineral oil, hydrophobic particles, and polysiloxanes.

In this context, the term "biocide" means any compound that is active against a biological entity, which may otherwise damage or degrade a substrate or a component in a coating composition or coating film. The biocide may actively kill the biological entity (so that the activity can be said to be "biocidal") or the biocide may prevent the growth of the biological entity (so that the activity can be said to be "biostatic"). The biocidal or biostatic activity may be directed against any biological entity capable of degrading a substrate or a component of a coating composition or coating film, i.e. the biological entity may be a fungus, such as a basidiomycete, an ascomycete, a mold or a filamentous fungus, an alga, a bacterium, an insect etc. In one non-limiting embodiment, the biocide can be methyl chloroisothiazolinone.

Any other biocides can be used in the present disclosure. For example, but by no way of limitation, fungicides, such as tolylfluanid, N-cyclopropyl-N'-(I,I-dimethylethyl)-6-(methylthio)-I,3,5-triazine-2,4-diamine, tetrachloroisophthalonitrile, N-(trichloromethylthio)phthalimide, propiconazol, tebuconazol, octyl-isothiazolinone, dichloro-isothiazolinone or quat; algaecides, such as ter-bythryn or zinkpyrothione; insecticides, such as fipronil, thiamethoxam, chlorofenapyr or thiachloprid; and bactericides.

In addition, commercially available biocides can also be used in the present disclosure. Examples can include, but are not limited to, Kathon™ LXE, Kathon™ LX, Rocima™ KO and Dowicil™ 75, which are available from The Dow Chemical Company. Polyphase® AF3 and Polyphase® PW40 are available from Troy Corporation. Acticide® OTW is available from Thor Group Limited. Proxel™ BD-20 is available from Lonza Inc.

The coating composition can further comprise a matting agent selected from the group consisting of amorphous silica, mica, clay, calcium carbonate, titanium dioxide, aerogel, micronized polymer powder, wax, and glass microbubbles.

In one non-limiting embodiment, the amorphous silica is Ace-Matt® TS 100, available from Evonik Industries. If the substrate used is glossy, higher amounts of silica (up to about 15% by weight) may be used to achieve a matte print surface. Suitable waxes can include, but are not limited to, carnauba wax, oxidized polyethylene wax, and montan wax.

The aqueous primer coating composition further comprises a pH adjuster or an optical brightener agent (OBA). The pH of the coating composition of the present disclosure can be less than 7, or less than 6, or less than 5.

Non-limiting examples of pH adjuster can include monoethanol amine, triethanol amine, methylaminoethanol, 2-amino-2-methyl-1-propanol, 2-(n-butylamino) ethanol, ammonium hydroxide, ammonia, caustic, potassium hydroxide, formic acid, acetic acid, citric acid, organic acids, minerals acids, hydrochloric acid, sulfuric acid, nitric acid, phosphoric acid, and the like. Mixtures of these compounds are also suitable as pH adjusters.

The OBAs such as the fluorescing agents, used in the present disclosure can include, but are not limited to, 4,4'-bis(triazinyl) amino-stilbene-2,2'-disulfonic acid (tetra sulfonated) and 4,4'-bis 2-sulfostyryl-biphenyl (distyrylbiphenyl). Other OBA additives such as disulfonated, and hexasulfonated substituted fluorescing agents would also be expected to be operative with the present disclosure.

The aqueous primer coating composition further comprises an antiblocking agent. The antiblocking agents can reduce residual tack when the substrate is rewound after coating and during storage. The antiblocking agents can include, but are not limited to, crosslinking agents, waxes, silica, polymeric beads, metal hydroxides, and mixtures thereof. Some antiblocking agents can also be used as matting agents. In one non-limiting embodiment, the crosslinking agent is melamine formaldehyde resin, which may be present in an amount of from about 0.05 to about 5 wt %. Other suitable crosslinking agents include sodium hydroxide, potassium hydroxide, zinc oxide, and polyethylene imine such as aziridine.

The aqueous primer coating composition comprises from about 5 to about 45% by weight of solid polymers including cationic polyurethane and polymers of oxazoline or N-vinylpyrrolidone. The solid polymers comprise about 25 to 99.5% by weight of solid cationic polyurethane, about 0.5 to about 75% by weight of solid polymers of oxazoline, and about 0.5 to about 75% by weight of solid polymers of N-vinylpyrrolidone.

The primer coating compositions can be prepared by mixing all the components into an open reactor at a temperature ranging from about 15° C. to about 50° C.

The primer coating composition may be applied onto many substrates including a cellulosic or polymeric substrate. Examples of the substrates used in the present disclosure can include, but are not limited to, polyethylene, polypropylene, biaxially oriented polypropylene (BOPP), monoaxially oriented polypropylene (MOPP), white oriented polypropylene (WOPP), polyethylene terephthalate (PET), glycol extended polyethylene terephthalate (PETG), metallized polyethylene terephthalate (MPET), polyamide, biaxially oriented polyamide (BOPA), monoaxially oriented polyamide (MOPA), polyvinyl chloride (PVC), polycarbonate (PC), polylactide, polylactone, polyurethane, polystyrene, foil such as aluminum foil, cellulosics, papers, paper board, cellophane, synthetic papers, metallized papers, and combinations thereof. The substrates can be coated and/or laminated. The primer coating composition of the present disclosure can also be applied onto primed substrates.

The present disclosure also relates to a method of applying an aqueous primer coating composition to a substrate. The method comprises providing the substrate having a first and a second surfaces and applying the aqueous primer coating composition to at least one surface of the substrate. The aqueous coating primer coating composition and the substrate are the same as those described previously.

The coating composition may be applied in-line on a press which is fitted with an in-line priming unit. Alternatively, the coating may be applied off-line. The coating onto a substrate can be conducted in any manner including gravure coating, roll coating, flexographic printing, wire rod coating, spray coating, screen printing, and the like.

Prior to applying the primer coating composition, a flame treatment or corona discharge treatment can be applied on the substrate. This treatment may be applied either in-line or off-line.

The method can further comprises drying the coating composition after applying the coating composition to the substrate. Upon drying, the coating forms a smooth, evenly distributed layer of about 0.1 to about 2 microns, or about 0.3 to about 0.5 microns, or about 0.20 to about 0.30 microns in thickness. After the coating is applied, it may be dried by hot air, radiant heat, or any other suitable means which provides a clear, adherent coated film. The primed substrate may then be overprinted by applying, e.g., liquid toner, from a digital printing apparatus to the primed surface of the substrate.

The primer coating composition can provide good bond strength when used on substrates which are printed with high speed digital presses such as the Indigo WS 6000 series of digital presses. The primer coating composition also works well as a print receptive coating on substrates printed on other well-known Indigo presses such as the WS 4000, WS 4500, and the like. The term "high speed" means a press having a linear speed of up about 30 meters/min for a four-color mode, and about 60 meters/min for a two-color mode. The primer coating composition is particularly useful when applied to polymeric substrates which are printed using HP Indigo WS 6800, WS 6600 or WS 6000 Digital Presses. These presses are designed to print onto labels for packaging, including wine labels, flexible packaging, sleeves, and folding cartons. Such digital presses include an optional in-line priming unit which allows the press to apply primer to uncoated substrates in-line and dry the primer just prior to printing. Thus, the presses are capable of priming and printing substrates in a single pass.

The resulting coating can provide good liquid toner transfer and adhesion, and results in a non-blocking surface once dried. The term "non-blocking" means that the coated substrate can be wound after coating on one surface and can be unwound without causing feeding problems in the printing press. The coating also provides non-blocking properties after printing when the printed substrate may be wound/unwound and applied to surfaces or formed into containers. In addition, the coating does not require the use of any additional primers or pre-coatings to achieve proper adhesion of the liquid toner to the substrate. The coating is also environmentally friendly as it is aqueous-based.

The present disclosure also relates to an electrophotographical printing medium coated with the aqueous coating composition described herein. The polymers and their applications according to the present disclosure may be prepared and used according to the examples set out below. These examples are presented herein for purposes of illustration of the present disclosure and are not intended to be limiting, for example, the preparations of the polymers and their applications.

EXAMPLES

Example 1

Cationic polyurethane dispersion was blended with various water soluble polymer solutions at 25° C. to provide coating compositions shown in Table 1. The coating compositions in Table 1 were based on percentage of solid polymer. All the components were obtained as aqueous solutions or dispersions except for polyethyloxazoline. Polyethyloxazoline was dissolved in water before blending with the cationic polyurethane dispersion.

TABLE 1

Primer Coating Compositions

| | Primer A | Primer B | Primer C | Primer D | Primer E | Primer F | Primer G | Primer H |
|---|---|---|---|---|---|---|---|---|
| Cationic polyurethane dispersion[1] | 100 | 75 | 50 | 25 | 75 | 50 | 75 | 75 |
| VP/VA copolymer[2] | | 25 | 50 | 75 | | | | |
| PEOx[3] | | | | | 25 | 50 | | |
| PEOx[4] | | | | | | | 25 | |
| VP/DMAEMA copolymer[5] | | | | | | | | 25 |

[1] Sancure® 20051, commercially available from The Lubrizol Corporation.
[2] Polyvinylpyrrolidone/vinylacetate: PVP/VA W-635, commercially available from Ashland LLC.
[3] Poly(2-ethy-2-oxazoline): Aquazol® 200 (Mw 200,000), commercially available from Polymer Chemistry Innovations, Inc.
[4] Poly(2-ethy-2-oxazoline): Aquazol® 500 (Mw 500,000), commercially available from Polymer Chemistry Innovations, Inc.
[5] Gafquat™ 755, commercially available from Ashland LLC.

The primer composition prepared according to Table 1 was coated onto various substrates including biaxially oriented polypropylene (BOPP) label stock, glycol modified polyethylene terephthalate (PETG), polyvinylchloride (PVC), and paper stock followed by printing on Hewlett-Packard Indigo WS 6800 press. The graphic work for this printing consisted of 5 rectangular ink blocks of 2 inch×8 inch size having different colors and print ink coverage of 300 to 364% as shown in Table 2.

TABLE 2

Color Combination for Inks

| Block Number | Yellow | Magenta | Cyan | K (Black) | White | Total |
|---|---|---|---|---|---|---|
| Ink a | 100% | 100% | | | 100% | 300% |
| Ink b | 50% | 50% | 50% | 50% | 100% | 300% |
| Ink c | 66% | 66% | 66% | 66% | 100% | 364% |
| Ink d | 50% | 50% | 50% | 100% | 100% | 350% |
| Ink e | 100% | | 100% | 50% | 100% | 350% |

The extent of ink transfer to the primed substrate films were inspected visually. The extent of ink fixation on the primed substrate films were conducted by pressing 3M 610 tape and/or industrial splicing red tape on each printed ink block rolling two times with 2 kg roller followed by manually peeling the tape with constant speed (ASTM F2252-03). The extent of ink fixation was inspected visually and recorded in percentage of the ink remaining on the substrate films. The average extents of ink transfer and ink fixation were recorded for all 5 ink blocks and listed in Table 3 and 4, respectively. 100% ink transfer or 100% ink fixation means that all the inks are staying on the primed substrates.

for water resistance. The BOPP label stock coated with the primers were laminated to 48-gauge PET film using water borne laminating adhesive (Purethane™ A1090 and Purethane™ C-CAT 104, commercially available from Ashland LLC.) and cured at 25° C. for 7 days. The laminated films were then cut into 1 inch width strips and immersed in water for 5 minutes. The films were then removed from water and

TABLE 3

Ink Transfer

| Extent of ink transfer | Primer A | Primer B | Primer C | Primer D | Primer E | Primer F | Primer G | Primer H |
|---|---|---|---|---|---|---|---|---|
| BOPP label stock | 100 | 100 | 100 | 100 | 100 | 100 | 100 | 100 |
| PETG | 100 | 100 | 100 | 100 | 100 | 100 | 100 | 100 |
| PVC | 100 | 100 | 100 | 100 | 100 | 100 | 100 | 100 |
| Paper stock | 100 | 100 | 100 | 100 | 100 | 100 | 100 | 100 |

TABLE 4

Ink Fixation

| Extent of ink fixation | Primer A | Primer B | Primer C | Primer D | Primer E | Primer F | Primer G | Primer H |
|---|---|---|---|---|---|---|---|---|
| BOPP label stock | 100 (98.8) | 100 (98.9) | 98.0 (98.0) | 92.0 | 100 (100) | 98.0 | 98.7 (99.2) | 99.7 (99.2) |
| PETG | 100 (98.9) | 100 (100) | 98.0 | 91.0 | 100 (100) | 99.0 | 99.7 (98.0) | 98.5 (96.7) |
| PVC | 100 (100) | 100 (100) | NT | NT | 100 (100) | NT | 97.9 (98.0) | 100 (99.4) |
| Paper stock | Tear | Tear | Tear | Tear | Tear | Tear | Tear | Tear |

Numbers in parenthesis were obtained from 610 tape testing and others were obtained from industrial red splicing tape testing
NT = Not tested All the primer compositions show 100% extent of ink transfer. The primer compositions having 75% or higher by weight of the cationic polyurethane blended with VP/VA copolymer and poly(2-ethyl-2-oxazoline) show the excellent extents of ink fixation on BOPP, PETG, and PVC substrate films. For paper stock substrate, the paper was torn during the tape testing, which indicates that the adhesion between the ink and the primer, and the adhesion between the primer and the substrate are very strong resulting in substrate tearing.

Primers A, B, E, G, H and Michem® In-Line Primer 030 (commercially available from Michelman Inc.) were tested the bond strength of the laminated films was measured by 180° peel test using Instron 3343. The testing results are listed in Table 5.

Table 5 demonstrates that Primer B, E, G, and H indicated cohesive failure of the laminating adhesive with some inks transferred to the PET film. While Primer A showed drops in bond strength after water immersion by more than 50% with majority of the inks transferred to PET film with the laminating adhesive. Michelman's commercial primer showed complete failure in primer resulting in all inks transferred to PET film with the laminating adhesive. Further studies on water-resistance showed that the experimental primers showed significant improvement over the cationic polyurethane and commercial primer.

TABLE 5

| | Bond strength | Primer A | Primer B | Primer E | Primer G | Primer H | Michem ® In-Line Primer 030 |
|---|---|---|---|---|---|---|---|
| Ink a | Before water immersion (g/inch) | 630 | 409 | 490 | 367 | 473 | 404 |
| | After water immersion (g/inch) | 305 | 384 | 503 | 471 | 353 | 22 |

TABLE 5-continued

| Bond strength | | Primer A | Primer B | Primer E | Primer G | Primer H | Michem ® In-Line Primer 030 |
|---|---|---|---|---|---|---|---|
| Ink b | Before water immersion (g/inch) | 563 | 401 | 513 | 355 | 388 | 367 |
| | After water immersion (g/inch) | 251 | 364 | 428 | 473 | 473 | 32 |
| Ink c | Before water immersion (g/inch) | 507 | 386 | 428 | 353 | 411 | 338 |
| | After water immersion (g/inch) | 139 | 468 | 401 | 440 | 185 | 26 |
| Ink d | Before water immersion (g/inch) | 552 | N/A | 422 | 344 | 366 | 441 |
| | After water immersion (g/inch) | 156 | N/A | 411 | 470 | 168 | 38 |
| Ink e | Before water immersion (g/inch) | 525 | N/A | 304 | 354 | 383 | 454 |
| | After water immersion (g/inch) | 141 | N/A | 388 | 360 | 220 | 30 |

What is claimed is:

1. An aqueous primer coating composition comprising:
an aqueous cationic polyurethane; and
an aqueous polymer of oxazoline or polymer of N-vinylpyrrolidone,
wherein the polymer of oxazoline is represented by a general formula (I):

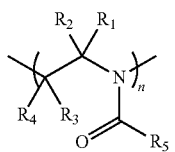

(I)

where $R_1$-$R_4$ are identical or different and are each independently a hydrogen atom, a halogen atom, an unsubstituted or substituted alkyl group, or an unsubstituted or substituted phenyl group; $R_5$ is a hydrogen atom or an alkyl group having 1 to 30 carbon atoms; and n is an integer and greater than 10.

2. The aqueous primer coating composition of claim 1, wherein the polymer of N-vinylpyrrolidone is a copolymer represented by a general formula (II):

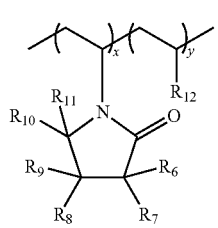

(II)

where $R_6$-$R_{11}$ are identical or different and are independently a hydrogen atom, an unsubstituted or substituted alkyl group, a halogen atom, or an unsubstituted or substituted aryl group; $R_{12}$ is selected from the group consisting of vinyl acetate, substituted or unsubstituted (meth)acrylate, and substituted or unsubstituted (meth)acrylamides; and x and y are integers and greater than 10.

3. The aqueous primer coating composition of claim 1, wherein the aqueous cationic polyurethane is a solution or dispersion.

4. The aqueous primer coating composition of claim 1, wherein the polymer of oxazoline is a solution or dispersion.

5. The aqueous primer coating composition of claim 1, wherein the polymer of N-vinylpyrrolidone is a solution or dispersion.

6. The aqueous primer coating composition of claim 1, further comprising a wetting agent, a defoamer, a surfactant or a biocide.

7. The aqueous primer coating composition of claim 6, wherein the wetting agent is an alcohol.

8. The aqueous primer coating composition of claim 6, further comprising a matting agent selected from the group consisting of amorphous silica, mica, clay, calcium carbonate, titanium dioxide, aerogel, micronized polymer powder, wax, and glass microbubbles.

9. The aqueous primer coating composition of claim 1, further comprising a pH adjuster or an optical brightener.

10. The aqueous primer coating composition of claim 9, further comprising an antiblocking agent selected from the group consisting of crosslinking agents, silica polymeric beads, metal hydroxides and combinations thereof.

11. The aqueous primer coating composition of claim 1, wherein the aqueous primer coating composition is coated on a substrate comprising a cellulosic or polymeric substrate.

12. The aqueous primer coating composition of claim 11, wherein the substrate is selected from the group consisting of polypropylene, biaxially oriented polypropylene, white polypropylene, polyethylene terephthalate, glycol extended polyethylene terephthalate, metallized polyethylene terephthalate, polyamide, biaxially oriented polyamide, polyvinyl chloride, foil, cellulosics or papers, and combinations thereof.

13. The aqueous primer coating composition of claim 12, wherein the substrate is coated or laminated.

14. The aqueous primer coating composition of claim 1, wherein the composition comprises from about 5% to about 45% by weight of solid polymers.

15. The aqueous primer coating composition of claim 14, wherein the solid polymers comprise about 25% to about 99.5% by weight of solid cationic polyurethane.

16. The aqueous primer coating composition of claim 14, wherein the solid polymers comprise from about 0.5% to about 75% by weight of solid polymer of oxazoline.

17. The aqueous primer coating of claim 14, wherein the solid polymers comprise from about 0.5% to about 75% by weight of solid polymer of N-vinyl pyrrolidone.

18. The aqueous primer coating compositions of claim 1, wherein the polymer of oxazoline is poly(2-ethyl oxazoline).

19. The aqueous primer coating composition of claim 1, wherein the polymer of N-vinylpyrrolidone is poly(N-vinylpyrrolidone-co-vinylacetate); a terpolymer of N-vinyl pyrrolidone, vinyl acetate and 3-Dimethyl aminopropyl methacrylamide (DMAPMA); or a terpolymer of N-vinylpyrrolidone, vinyl acetate and N,N-dimethylaminoethyl methacrylate (DMAEMA).

20. The aqueous primer coating composition of claim 2, wherein the copolymer is a copolymer of N-vinylpyrrolidone and 3-dimethyl aminopropyl methacrylamide (DMAPMA) or a copolymer of N-vinylpyrrolidone and N,N-dimethylaminoethyl methacrylate (DMAEMA).

* * * * *